2,922,709

PRODUCTION OF ELEMENTAL ALKALI AND ALKALINE EARTH METALS AND CARBON

Stanford J. Hetzel, Newtown Square, Pa., assignor to Sun Oil Company, Philadelphia, Pa., a corporation of New Jersey No Drawing. Application June 17, 1958
Serial No. 742,491

8 Claims. (Cl. 75—66)

This invention relates to the production of elemental metals and carbon from hydrocarbons and inorganic salts.

Although the manufacture of elemental carbon from hydrocarbons by incomplete combustion, and of elemental metals from inorganic salts, for example by electrolysis, is known in the prior art, the possibility of obtaining these products simultaneously by the reaction of hydrocarbons with inorganic salts has not been recognized in the prior art. The present invention provides a method for obtaining this useful result, and provides a superior manner of utilizing the starting materials which are involved.

The process according to the invention involves contacting a hydrocarbon material with an alkali metal or alkaline earth metal halide at a temperature in the approximate range from 800 to 1400° C., preferably 900 to 1200° C. The reaction temperature is obtained by heating, e.g., by means of an electric arc or by indirect heat transfer from electrical or chemical heating means. In one advantageous embodiment, the inorganic salt reactant may be used as electrode material in the use of an electric arc, with the electrodes being moved gradually toward each other to replace the salt as it is used up.

The products obtained include elemental metal, elemental carbon, and usually inorganic acid. The elemental metal which is formed is sometimes in the vapor state at the reaction temperature, in which case this product can be condensed from the product vapor. In the event that the metal product is in liquid state at the reaction temperature, and the inorganic salt reactant is also in liquid state, the two materials are generally not miscible with each other and can be separated gravimetrically. Frequently, the elemental metal has lesser specific gravity than the salt, and can be skimmed from the upper layer. The reaction should be carried out under essentially anhydrous conditions to avoid conversion of the elemental metal.

The inorganic acid product obtained in the process according to the invention is a gaseous material or a vapor at the reaction temperature, and can be separated from unconverted hydrocarbon by fractional condensation, or by dissolving the inorganic acid in water and separating the hydrocarbon, either in vapor or liquid state, from the aqueous solution of the inorganic acid.

The elemental carbon product is a solid material which can be removed from vapor phase products for example by cyclone separation or other suitable known means for separating solids from gaseous material. The elemental carbon product can be separated from liquid inorganic salt by dissolving the salt in water and separating carbon from the resulting solution.

The following examples illustrate the invention:

Example I

Molten sodium chloride is contacted at 900° C. with methane introduced at a rate of about 5 moles of methane per 100 moles of salt per hour. The vapor phase products of the reaction which occurs between sodium chloride and methane at 900° C. contain sodium vapor, hydrogen chloride gas and usually some unconverted methane. The sodium is selectively condensed from the vapor phase products to obtain an elemental sodium product. The uncondensed mixture of hydrogen chloride and methane is then contacted with water to dissolve hydrogen chloride, and the gaseous undissolved methane is recycled to the conversion zone for reaction with sodium chloride.

The elemental carbon, which is formed in the reaction of methane and sodium chloride, becomes suspended in the liquid sodium chloride and gradually builds up during the course of the reaction. When the amount of carbon reaches an undesirable level, the mixture in one embodiment is cooled to room temperature, and water is added in order to dissolve the salt. The undissolved carbon is separated by filtration from the aqueous solution of the salt to obtain an elemental carbon product.

In an alternative embodiment, when the amount of carbon has reached an undesirable level, the introduction of methane is discontinued, and air is introduced into the mixture at the prevailing elevated temperature in order to burn the elemental carbon. The rate of burning is controlled, by means of the air rate, so that the temperature does not reach a level at which sodium chloride is vaporized from the reaction mixture. When a sufficient amount of carbon has been burned to permit satisfactory further operation according to the invention, the introduction of air is discontinued, and the introduction of methane is resumed. Prior to this resumption, an additional amount of salt can be added to the reaction mixture.

Example II

Magnesium chloride vapor is contacted, at 1000° C. and at a reduced pressure sufficient to maintain the salt in vapor state, with methane in a ratio of 2 moles of salt per mole of methane. The vapor phase products of the reaction between magnesium chloride and methane contain, at the reduced pressure, some unconverted salt, magnesium vapor, hydrogen chloride and methane. These vapor phase products are separated from the solid carbon which is also formed by the reaction between methane and salt. Magnesium chloride is then selectively condensed from the vapor phase products, and this material can be recycled to the reaction zone for conversion by contact with methane. Elemental magnesium is then selectively condensed from the remaining vapor phase materials to obtain an elemental magnesium product. The hydrogen chloride and methane remaining in the vapor phase products are then separated in a manner similar to that described in Example I.

Generally similar results, with respect to formation of elemental metal and carbon, to those obtained in Examples I and II can be obtained employing other inorganic salts as starting material, for example potassium chloride, calcium bromide, sodium fluoride, etc. Also, generally similar results can be obtained with other hydrocarbon materials such as propylene, n-butane, benzene, cyclohexane, higher hydrocarbons, etc. However, superior results are obtained according to the invention employing alkali metal halides and normally gaseous hydrocarbons as the starting materials.

The temperatures required to obtain a given physical state of salt reactant, and the manner of working up the reaction products, may differ from that in Examples I and II depending on the properties of the reactants and products, and can be determined in the light of the present specification by a person skilled in the art.

The pressure at which the process according to the invention is carried out is not critical. Subatmospheric pressures, e.g. down to 100 mm. of Hg absolute or lower, can be employed if desired, or superatmospheric pressures, e.g. up to 500 p.s.i.g. or higher. Frequently it will be desirable to operate at atmospheric pressure, unless reduced pressure is needed to maintain a reactant or product in vapor phase, or unless elevated pressure is needed to increase the residence time in the reaction zone at a given temperature and weight throughput of vapor phase reactant.

In reactions where the salt is in vapor phase, the reactants are preferably contacted in approximately stoichiometric amounts. However, an excess of either component, e.g. up to a 50% molar excess or greater, of either component can be used if desired. Where the salt is in liquid phase, 1 to 25 moles of hydrocarbon are preferably contacted with salt per 100 moles of salt per hour, though the rate is not critical and other rates can be used.

The invention claimed is:

1. Process for producing elemental metal and elemental carbon which comprises contacting a salt selected from the group consisting of alkali metal halides and alkaline earth metal halides with a hydrocarbon at a temperature within the approximate range of 800 to 1400° C. and recovering elemental metal and elemental carbon from the reaction product.

2. Process according to claim 1 wherein said contacting is performed with the salt in liquid phase.

3. Process according to claim 1 wherein said contacting is performed with the salt in vapor phase.

4. Process according to claim 1 wherein said salt is an alkali metal halide and said hydrocarbon is a normally gaseous hydrocarbon.

5. Process according to claim 1 wherein said elemental metal is recovered as vapor, and water is added to the liquid halide containing solid elemental carbon, the latter being subsequently separated from the resulting aqueous solution.

6. Process according to claim 1 wherein said temperature is within the approximate range from 900 to 1200° C.

7. Process for producing elemental metal and elemental carbon which comprises contacting an alkali metal halide with a hydrocarbon at a temperature within the approximate range from 800 to 1400° C. and recovering elemental metal and elemental carbon from the reaction product.

8. Process for producing elemental metal and elemental carbon which comprises contacting a salt in vapor phase selected from the group consisting of alkali metal halides and alkaline earth metal halides with a hydrocarbon at a temperature within the approximate range from 800 to 1400° C., and separating elemental carbon from the vapor phase products of said contacting.

References Cited in the file of this patent

UNITED STATES PATENTS

| | | |
|---|---|---|
| 1,671,003 | Bagsar | May 22, 1928 |
| 1,961,424 | Maier | June 5, 1934 |
| 2,111,661 | Ebner | Mar. 22, 1938 |
| 2,384,971 | Silvasy et al. | Sept. 18, 1945 |